(12) United States Patent
Maufer et al.

(10) Patent No.: US 7,502,925 B2
(45) Date of Patent: Mar. 10, 2009

(54) METHOD AND APPARATUS FOR REDUCING TCP FRAME TRANSMIT LATENCY

(75) Inventors: Thomas A. Maufer, Menlo Park, CA (US); Paul J. Sidenblad, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 938 days.

(21) Appl. No.: 10/828,024

(22) Filed: Apr. 19, 2004

(65) Prior Publication Data

US 2005/0232161 A1    Oct. 20, 2005

(51) Int. Cl.
*H04L 9/00* (2006.01)
(52) U.S. Cl. ..................................... 713/161
(58) Field of Classification Search ................... 713/161
See application file for complete search history.

(56) References Cited

U.S. PATENT DOCUMENTS

| 5,522,039 | A | * | 5/1996 | Snyder et al. ............... 714/52 |
| 5,815,516 | A | * | 9/1998 | Aaker et al. ............... 714/807 |
| 6,055,236 | A | * | 4/2000 | Nessett et al. ............ 370/389 |
| 6,442,161 | B1 | * | 8/2002 | Drummond-Murray et al. .. 370/389 |
| 7,020,079 | B2 | * | 3/2006 | Chu ........................... 370/225 |
| 2002/0019933 | A1 | * | 2/2002 | Friedman et al. ............ 713/160 |
| 2002/0083317 | A1 | * | 6/2002 | Ohta et al. .................. 713/161 |
| 2003/0196081 | A1 | * | 10/2003 | Savarda et al. ............. 713/153 |

OTHER PUBLICATIONS

J. Zweig et al, "TCP Alternate Checksum Options", IETF Standard, Internet Engineering Task Force, Mar. 1990, pp. 1-5.*
Michael S. Borella, "Methods and Protocols for Secure Key Negotiation Using IKE," *IEEE Network*, Jul./Aug. 2000 vol. 14(4): pp. 18-29.
J. Zweig et al., "TCP Alternate Checksum Options," *IETF Standard, Internet Engineering Task Force*, Mar. 1990, pp. 1-5.

* cited by examiner

*Primary Examiner*—Nasser G Moazzami
*Assistant Examiner*—Michael S McNally
(74) *Attorney, Agent, or Firm*—Patterson & Sheridan, LLP

(57) ABSTRACT

An alternate checksum option for transmitting TCP frame data is used that does not require computing a TCP checksum. Instead, an integrity check value is computed and placed in the ESP authentication portion near the end of the frame. Transmission of a portion of the TCP frame data may begin before all of the TCP frame data is received by a TCP checksum offload device because the integrity check value is inserted at the end of the frame. Furthermore, the integrity check value is computed using a static key or a dynamic key may be computed to cover a greater portion of the frame compared with ESP authentication specified by the IPsec standard.

21 Claims, 12 Drawing Sheets

US 7,502,925 B2

METHOD AND APPARATUS FOR REDUCING TCP FRAME TRANSMIT LATENCY

FIELD OF THE INVENTION

One or more aspects of the invention generally relate to TCP processing, and more particularly to reducing frame transmission latency.

BACKGROUND

Conventional Transmission Control Protocol (TCP) processing is exemplified by systems and methods developed to facilitate data transfer between a local or remote client and a server. Software implementations executed on a host processor, e.g., Central Processing Unit (CPU), are comparatively inexpensive, but slow compared with dedicated hardware implementations, such as those included within a Network Interface Card (NIC), designed to offload TCP processing from the host processor.

Some of the TCP processing that is offloaded is the computation of TCP's checksum for outgoing frame data. A NIC receives outbound payload data from the CPU, constructs frames, and outputs the frames via a Local Area Network (LAN) interface. Construction of a frame includes constructing a TCP header and an IP header. The TCP header is positioned at the beginning of the frame and includes the TCP checksum field. Conventionally, transmission of the frame cannot begin until the TCP checksum has been calculated, therefore payload data is typically stored in dedicated memory within the NIC until all of the payload data for the frame has been received by the NIC and the TCP checksum is calculated. The TCP checksum is then inserted in the header portion of the constructed frame and the constructed frame is output. Transmission latency is incurred while the NIC waits to receive the entire frame prior to completing the TCP checksum calculation.

Therefore, there is a need to reduce frame transmission latency by beginning transmission of the frame prior to computing the TCP checksum.

SUMMARY

Various embodiments of a method of the invention include determining whether a peer supports using a dynamic key code-point for the TCP alternate checksum option, negotiating a key exchange with the peer when the dynamic key code-point is supported, and using a static key code-point when the key exchange negotiation fails.

Various embodiments of a method of the invention include receiving a portion of TCP payload data for transmission, transmitting the portion of the TCP payload data without computing a TCP checksum, and computing an integrity check value for at least the TCP payload data.

Various embodiments of a method of the invention include receiving TCP payload data within a frame transmitted over a connection using the TCP alternate checksum option, determining the TCP alternate checksum option is setup for the connection, determining whether a static key code point or a dynamic key code point is specified for the connection, and computing an integrity check value using the TCP payload data and a shared key.

Various embodiments of the invention include an apparatus for transmitting TCP payload data using the TCP alternate checksum option. The apparatus includes a means for transmitting a TCP header including a predetermined TCP checksum value, a means for computing an integrity check value using the TCP payload data and a shared key, and a means for inserting the integrity check value into a frame (including the TCP payload data), following the TCP payload data.

The current invention involves new apparatus and methods which reduce TCP frame transmission latency.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The present invention defines a mechanism that enables use of a TCP alternate checksum option instead of a conventional TCP checksum. The RFC-1146 standard specifies an experimental TCP alternate checksum algorithm negotiation that is used by the present invention to determine a "code point" for a connection that specifies an Internet Security (IPsec) Encapsulating Security Payload (ESP) authentication transform algorithm. Specifically, a modified IPsec ESP Integrity Check Value (ICV), hereafter referred to as "ICV", is used as described further herein. TCP alternate checksum options are described in detail in Internet Engineering Task Force (IETF) RFC-1146 authored by J. Zweig and C. Partridge, published March 1990.

Figure 1:
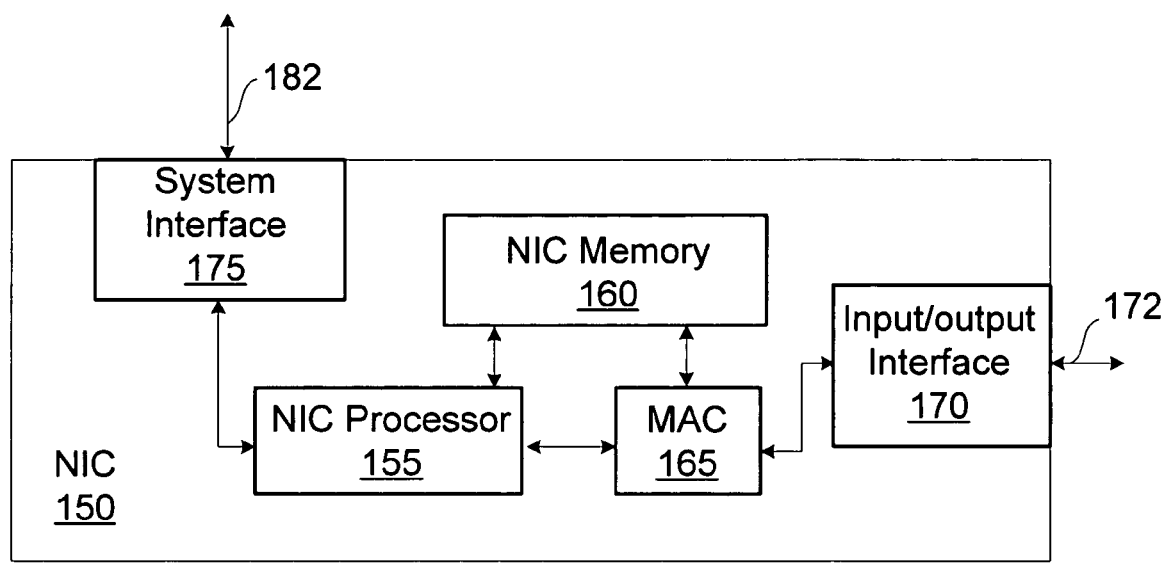
FIG. 1 is a block diagram of an exemplary embodiment of a NIC in accordance with one or more aspects of the present invention.

FIG. 1 is a block diagram of an exemplary embodiment of a NIC 150 in accordance with one or more aspects of the present invention. NIC 150 may share Bus 182, e.g., Peripheral Component Interface (PCI) bus, with one or more PCI devices. NIC 150 includes a System Interface 175, a NIC Processor 155, a Medium Access Controller (MAC) 165, NIC Memory 160, and an Input/Output Interface 170 to interface to a Network 172. Input/Output Interface 170 may couple NIC 150 to a physical layer (PHY), e.g., 802.3 PHY, HPNA 1.0 PHY, HPNA 2.0 PHY, or the like. In an alternate embodiment a PHY is included within NIC 150 and Input/Output Interface 170 is an ETHERNET interface such as Gigabit ETHERNET.

A software driver for NIC 150 communicates between NIC 150 and an application program executing on a CPU. NIC Processor 155 within NIC 150 is used for TCP processing in lieu of having the CPU execute a TCP stack to perform TCP processing. Therefore, NIC 150 offloads the CPU, freeing CPU processing cycles for other applications. Likewise, NIC Memory 160 replaces memory space within system memory, freeing memory for allocation to other applications.

NIC 150 receives frames via Input/Output Interface 170, detects whether or not a frame is valid, parses valid frames, and uploads payload data to system memory. NIC 150 transmits acknowledgements to the sender confirming a valid frame has been received. NIC 150 receives outbound payload data via Bus 182, constructs frames, and outputs the frames via Input/Output Interface 170. Unlike a conventional NIC, transmission of the frame may begin without completing calculation of the TCP checksum, therefore the transmission latency is reduced. Instead of calculating the TCP checksum, NIC 150 inserts a fixed value, such as 0x0, in the TCP checksum field and uses the ICV as a TCP alternate checksum option.

The ICV is placed in the ESP field positioned after the payload data, at the end of the frame. The ICV may be computed using algorithms known to those skilled in the art, such as the 8-bit Fletcher checksum algorithm or the 16-bit Fletcher checksum algorithm. Alternatively, the ICV may be computed using IPsec ESP authentication transforms known to those skilled in the art, such as HMAC-MD5 or HMAC-SHA-1. Various code point values may be defined to specify how the ICV is computed, such as, that an authentication transform uses a dynamic key to compute the ICV or that an authentication transform uses a static key to compute the ICV.

Unlike a conventional NIC, the maximum transmission latency is also fixed, regardless of the packet size. Specifically, the maximum transmission latency is determined by the amount of buffering needed to construct the ESP field including padding (up to 255 bytes) for the ICV and the ICV (typically 12, 16, or 20 bytes). In contrast, the maximum transmission latency for a conventional NIC is dependent on the maximum transmission unit (MTU), which may be as large as or larger than 1500 bytes.

When a conventional TCP checksum is used, a portion of NIC Memory 160 or alternatively a dedicated buffer, e.g. FIFO (first in first out memory), is needed to store the payload data, at least up to the maximum segment size (MSS), during calculation of the TCP checksum. When the TCP alternate checksum option is used, the portion of NIC Memory 160 needed for frame transmission is reduced to a small fixed amount of memory. Specifically, in one embodiment, as little as 288 bytes of memory may be used to store the ICV and padding.

Figure 2A:
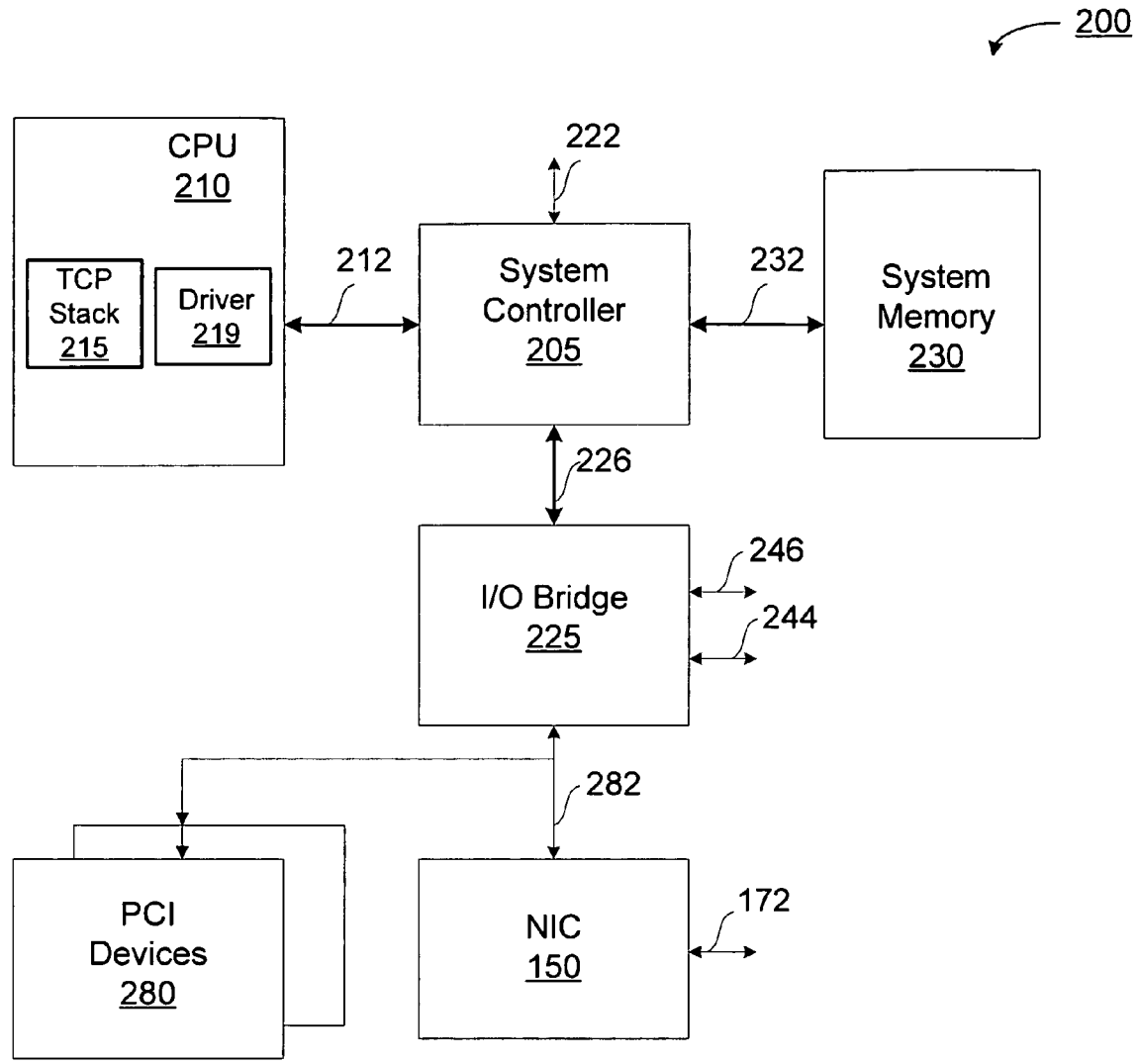
FIGS. 2A, 2B, and 2C illustrate block diagrams of exemplary embodiments of computing systems including a host computer in accordance with one or more aspects of the present invention.

FIG. 2A is a block diagram of an exemplary embodiment of a computer system generally designated 200 including a CPU 210 and NIC 150. Computing System 200 may be a desktop computer, server, laptop computer, palm-sized computer, tablet computer, game console, portable wireless terminal such as a PDA or cellular telephone, computer based simulator, or the like. NIC 150 offloads some TCP processing from CPU 210. CPU 210 executes TCP Stack 215 which includes code to complete at least some of the TCP processing; specifically the TCP processing that is not performed by NIC 150.

TCP Stack 215 negotiates and sets up a connection, as described further herein. Driver 255 is effectively a translator between TCP Stack 215 and NIC 150, issuing commands to NIC 150 as requested by TCP Stack 215. Driver 255 also informs TCP Stack 215 when payload data has been uploaded by NIC 150 to System Memory 230. Although communications between TCP Stack 215 and NIC 150 are accomplished using Driver 255, Driver 255 may not be explicitly indicated henceforth.

A Bus 212 coupling CPU 210 to a System Controller 205 may be a front side bus (FSB). Accordingly, Computing System 200 may, in this example, be a hub-based architecture, also known as an INTEL® hub architecture, where System Controller 205 is a memory controller hub and an I/O Bridge 225 is coupled to System Controller 205 via a Hub-to-hub Interface 226. System Controller 205 is coupled to System Memory 230 via a Memory Bus 232. I/O Bridge 225 includes a controller for PCI Bus 282 and may include controllers for a System Management Bus (SMBus) 246, a Universal Serial Bus (USB) 244, and the like. Additional PCI devices, such as PCI Devices 280, may share PCI Bus 282 with NIC 150. I/O Bridge 225 may be a single integrated circuit or single semiconductor platform. Examples of System Controller 205 known in the art include INTEL® Northbridge. Examples of I/O Bridge 225 known in the art include INTEL® Southbridge or an NVIDIA® Corporation Media and Communications Processor chip.

Figure 2B:
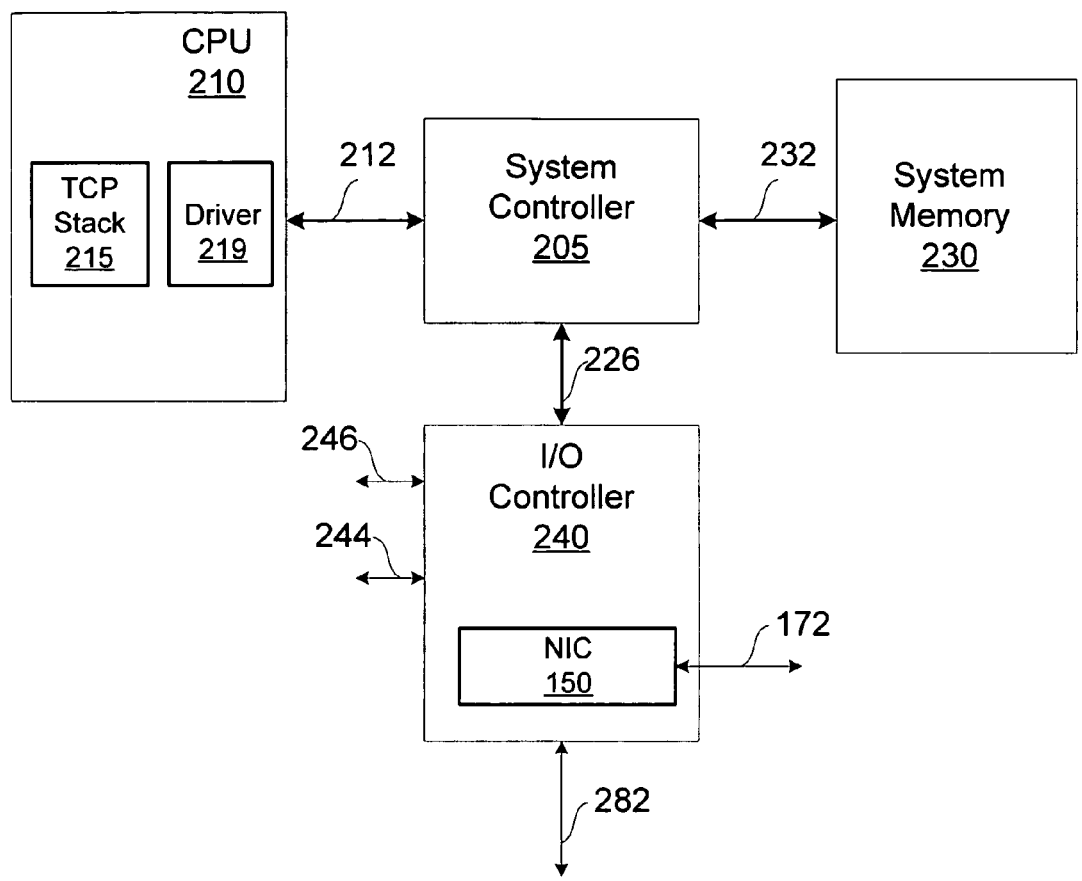

FIG. 2B illustrates a block diagram of another exemplary embodiment of a Computing System 201 including CPU 210 and NIC 150 in accordance with one or more aspects of the present invention. As described in conjunction with FIG. 2A, NIC 150 offloads some TCP processing from CPU 210. CPU 210 executes TCP Stack 215 and Driver 219. CPU 210 is coupled to a System Controller 205 via Bus 212. System Controller 205 is coupled to System Memory 230 by System Bus 232. System Controller 205 is coupled to an I/O Controller 240 via Hub-to-hub Interface 226.

I/O Controller 240 includes a controller for PCI Bus 282 and may include controllers for SMBus 246, USB 244, and the like. In an alternative embodiment, I/O Controller includes a controller for PCI Express bus. I/O Controller 240 also includes NIC 150, effectively decoupling NIC 150 from devices coupled to I/O Controller 240 via PCI Bus 282. I/O Controller 240 may be a single integrated circuit or single semiconductor platform.

Figure 2C:
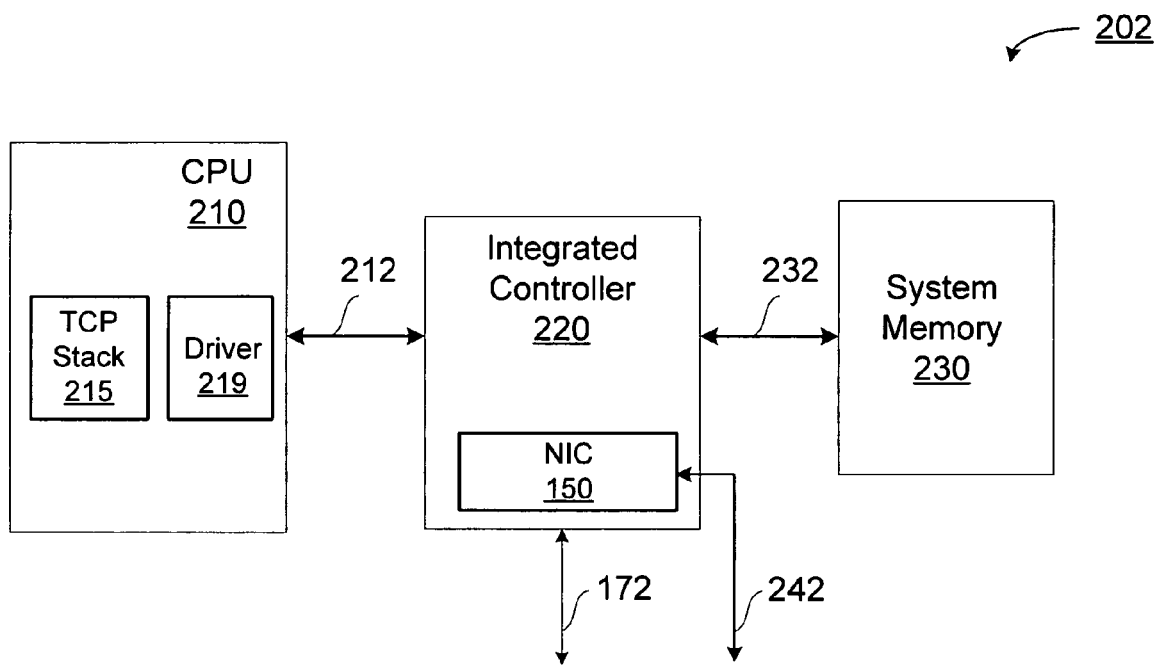

FIG. 2C illustrates a block diagram of another exemplary embodiment of a Computing System 202 including CPU 210, Integrated Controller 220, and NIC 150 in accordance with one or more aspects of the present invention. As described in conjunction with FIGS. 2A and 2B, NIC 150 offloads some TCP processing from CPU 210. CPU 210 executes TCP Stack 215 and Driver 219. Integrated Controller 220 performs at least some of the functions performed by System Controller 205 and I/O Controller 240 and includes NIC 150. Integrated Controller 220 may also include additional I/O controllers (not shown), e.g., SMBus, USB, general purpose I/O (GPIO), integrated device electronics (IDE), and the like.

Figure 3A:
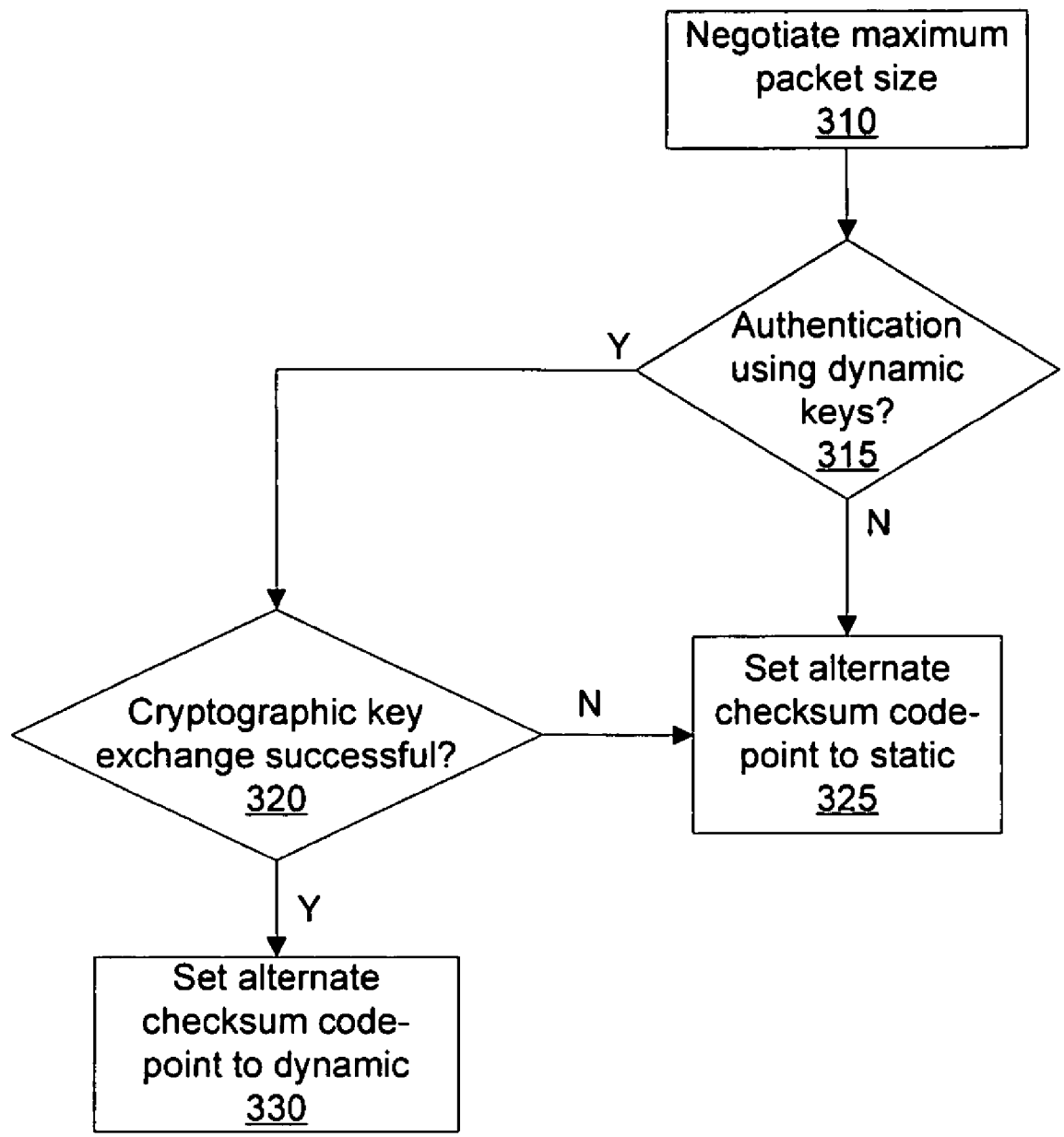
FIG. 3A illustrates an embodiment of a method of setting up a connection using an alternate TCP checksum option in accordance with one or more aspects of the present invention.

FIG. 3A illustrates an embodiment of a method of setting up a connection using a TCP alternate checksum option in accordance with one or more aspects of the present invention.

Conventionally, a TCP connection is established by way of a 3-way handshake using a process known to those skilled in the art. The steps shown in FIG. 3A may be included in such a process to set up a connection using a TCP alternate checksum option between Ipsec-capable peers.

In step 310, a TCP stack negotiates the maximum packet size. The maximum packet size may be determined based on the largest frame that can be buffered by a receiver. When a TCP alternate checksum option is used, the maximum packet size is not necessarily limited by the size of a buffer to store outgoing frame data in a transmitter. In step 315, the TCP stack determines if an IPsec ESP authentication transform will use a dynamic key code point, i.e., the TCP peer for the connection being negotiated supports a TCP alternate checksum option using a dynamic key.

If, in step 315 the TCP stack determines the IPsec ESP authentication transform will not use the dynamic key code point, i.e., a static key code point will be used, then the method proceeds to step 325. If, in step 315 the TCP stack determines the IPsec ESP authentication transform will use the dynamic key code point, then in step 320 the TCP stack determines if a cryptographic key exchange was successful to provide a dynamic key. In one embodiment, the internet key exchange (IKE) protocol is used to complete the cryptographic key exchange and the dynamic key is at least 128 bits long.

If, in step 320 the TCP stack determines the cryptographic key exchange was not successful, the method proceeds to step 325. In step 325 the TCP stack sets the TCP alternate checksum number to the static key code point. In one embodiment, the static key code point is 0xFF. When the static key code point is specified, a fixed static key is used to perform the IPsec ESP authentication transform to compute an ICV for each frame prior to transmission of the frame. If, in step 320 the TCP stack determines the cryptographic key exchange was successful, then, in step 330 the TCP stack sets the TCP alternate checksum number to the dynamic key code point. A cryptographic key exchange may succeed when the peers are members of two security domains that have a trust relationship. In one embodiment, a TCP alternate checksum number of 0xFE indicates that a dynamic key code point will be used.

When the dynamic key code point is used it is computationally infeasible for an attacker to modify the frame and recalculate the ICV. Therefore, unlike a connection using the conventional TCP checksum, the connection using the TCP alternate checksum option with dynamic keying is not vulnerable to man-in-the-middle attacks, replay based attacks, or the like. Although using the static key code point does not protect against man-in-the-middle attacks or replay based attacks, it provides at least as much security as the conventional TCP checksum while reducing frame transmission latency.

Figure 3B:
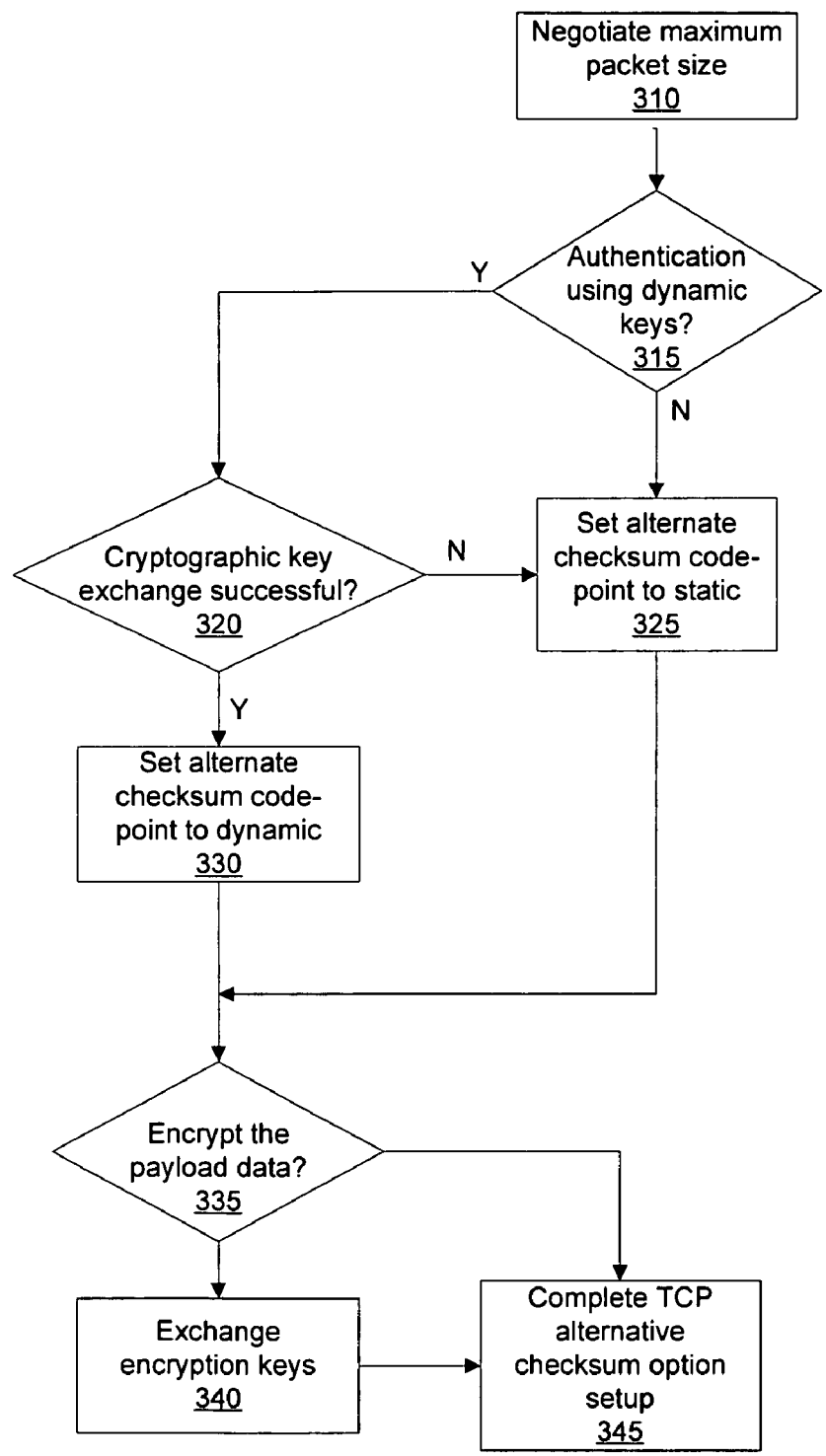
FIG. 3B illustrates an embodiment of a method of setting up a connection using an alternate checksum option including exchanging encryption keys in accordance with one or more aspects of the present invention.

FIG. 3B illustrates an embodiment of a method of setting up a connection using an alternate checksum option including exchanging an encryption key in accordance with one or more aspects of the present invention. Steps 310, 315, 320, 325, and 330 are completed as described in conjunction with FIG. 3A. In step 335 TCP stack determines if the payload data should be encrypted using an encryption standard such as DES or 3DES, and, if so, in step 340 a private key is exchanged and the method proceeds to step 345. In one embodiment, the IKE protocol is used to complete the private key exchange. If, in step 335 the TCP stack determines the payload data should not be encrypted, then, in step 345 the TCP alternate checksum portion of the connection setup is complete.

Once the TCP alternate checksum option connection setup is completed for a specific connection, data may be transmitted or received by NIC 150 using a shared key, where the shared key is either the static key or the dynamic key. In some embodiments, coverage of the IPsec ESP authentication is extended to cover the MAC and IP headers. NIC 150 may use the shared key to produce the ICV using a cryptographic keyed hash function such as HMAC-MD5, HMAC-SHA-1, or the like, using techniques known to those skilled in the art. In some embodiments, the cryptographic keyed hash function is fixed. In other embodiments, the cryptographic hash function is determined during the connection setup process.

Figure 4A:
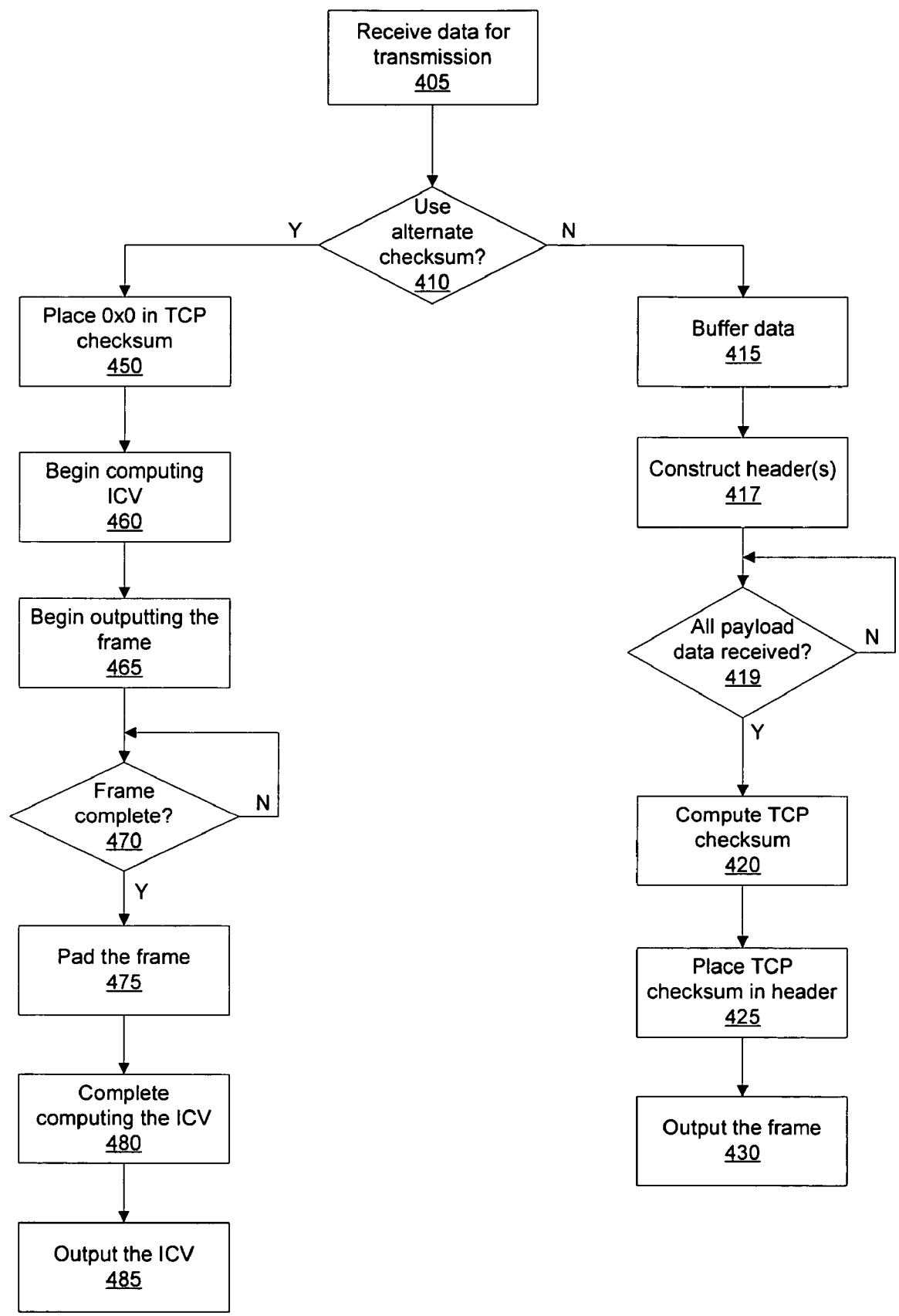
FIG. 4A illustrates an embodiment of a method of transmitting a frame in accordance with one or more aspects of the present invention.

FIG. 4A illustrates an embodiment of a method of transmitting a frame in accordance with one or more aspects of the present invention. In step 405 NIC 150 receives data for transmission from TCP Stack 215. In step 410 NIC 150 determines if the TCP alternate checksum option is setup for the connection specified by the packet. In one embodiment NIC 150 the TCP alternate checksum option is used when the alternate checksum number is set to 0xFE or 0xFF.

If, in step 410 NIC 150 determines the connection is not setup for using the TCP alternate checksum option, then, a conventional TCP checksum will be used to transmit the data received in step 405, and in step 415 NIC 150 buffers the data to construct a frame for transmission. In step 417 the headers, IPv4, IPv6, TCP, or the like, for the frame are constructed. Specifically, when IPv4 is used, NIC 150 computes an IPv4 checksum for the IPv4 header. NIC 150 also constructs a TCP header, however, the TCP checksum field is not complete until the TCP checksum is computed. In step 419 NIC 150 determines if all of the payload data for the frame has been received, and, if not, step 417 is repeated. Otherwise, in step 420 NIC 150 computes the TCP checksum for the frame. In step 425 the TCP checksum is placed in the TCP header portion of the frame and in step 430 the frame is output for transmission.

If, in step 410 NIC 150 determines the connection is setup for using the TCP alternate checksum option, then, in step 450 a predetermined value, such as 0x0, is placed in the TCP checksum field of the frame. The predetermined value is recognized by the sender and receiver and indicates that the TCP alternate checksum option is used for the connection. In step 460 NIC 150 begins computing an ICV when a first portion of the payload data is received.

In step 465, NIC 150 begins outputting the frame, including the header and the first portion of the payload data. In step 470, NIC 150 determines if the frame is complete, and, if not, additional payload data received by NIC 150 is output. If, in step 470 NIC 150 determines that the frame is complete, i.e., the MSS has been reached, then, in step 475, NIC 150 pads the frame as needed. In step 480, NIC 150 completes computing the ICV for the frame and in step 485 NIC 150 outputs the ICV in the ESP field. Finally, the frame check sequence (FCS) checksum is output following the ESP field.

Figure 4B:
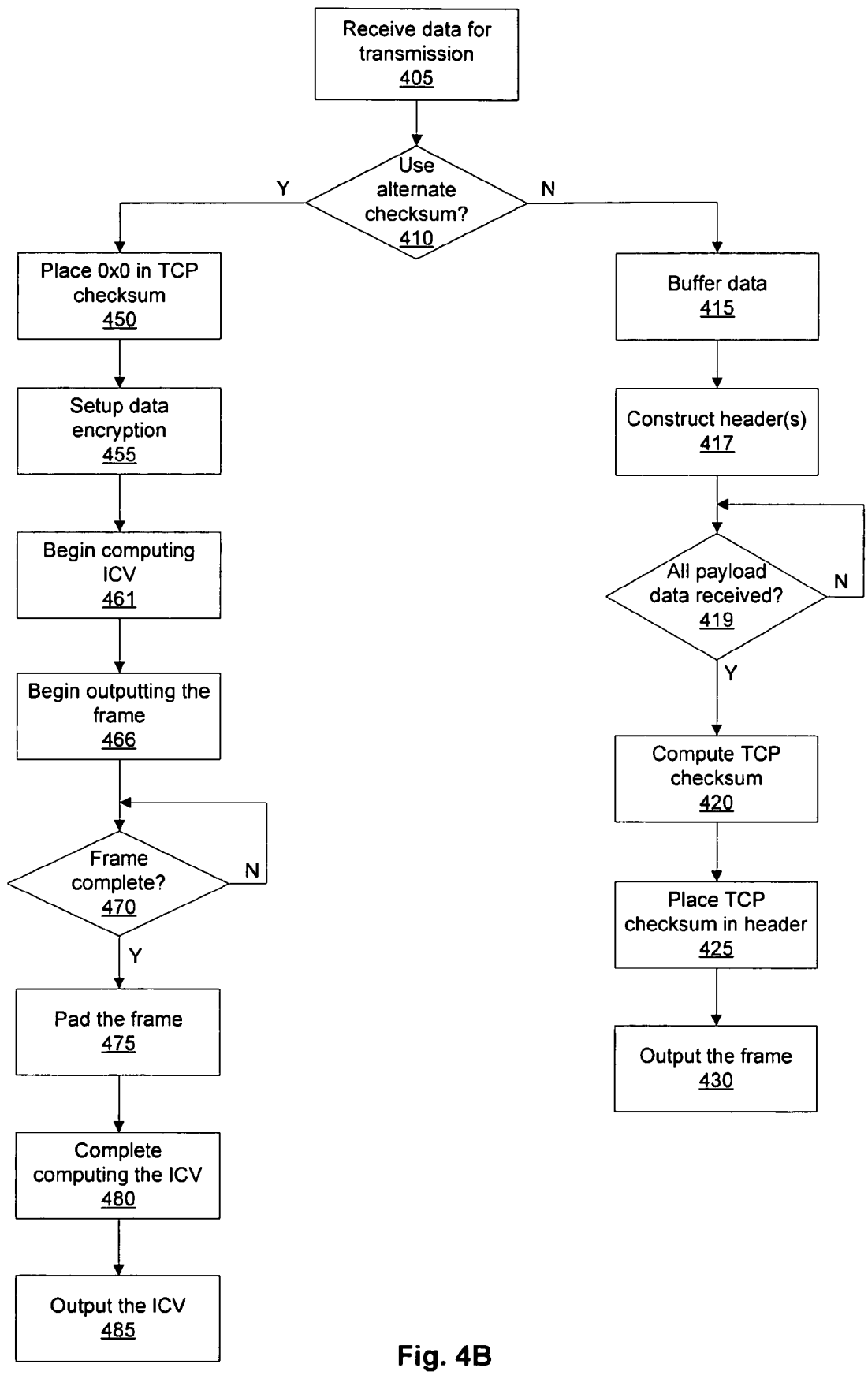
FIG. 4B illustrates an embodiment of a method of transmitting an encrypted frame in accordance with one or more aspects of the present invention.

FIG. 4B illustrates an embodiment of a method of transmitting an encrypted frame in accordance with one or more aspects of the present invention. Steps 405 through 450 are completed as previously described in conjunction with FIG. 4A. In step 455 NIC 150 is configured to encrypt the payload data using a private key to generate encrypted payload data. In step 461 NIC 150 begins computing an ICV when a first portion of the encrypted payload data is received. In step 466 NIC 150 begins outputting the frame, including the header and the first portion of the encrypted payload data. Steps 470 through 485 are completed as previously described in conjunction with FIG. 4A.

Figure 5:
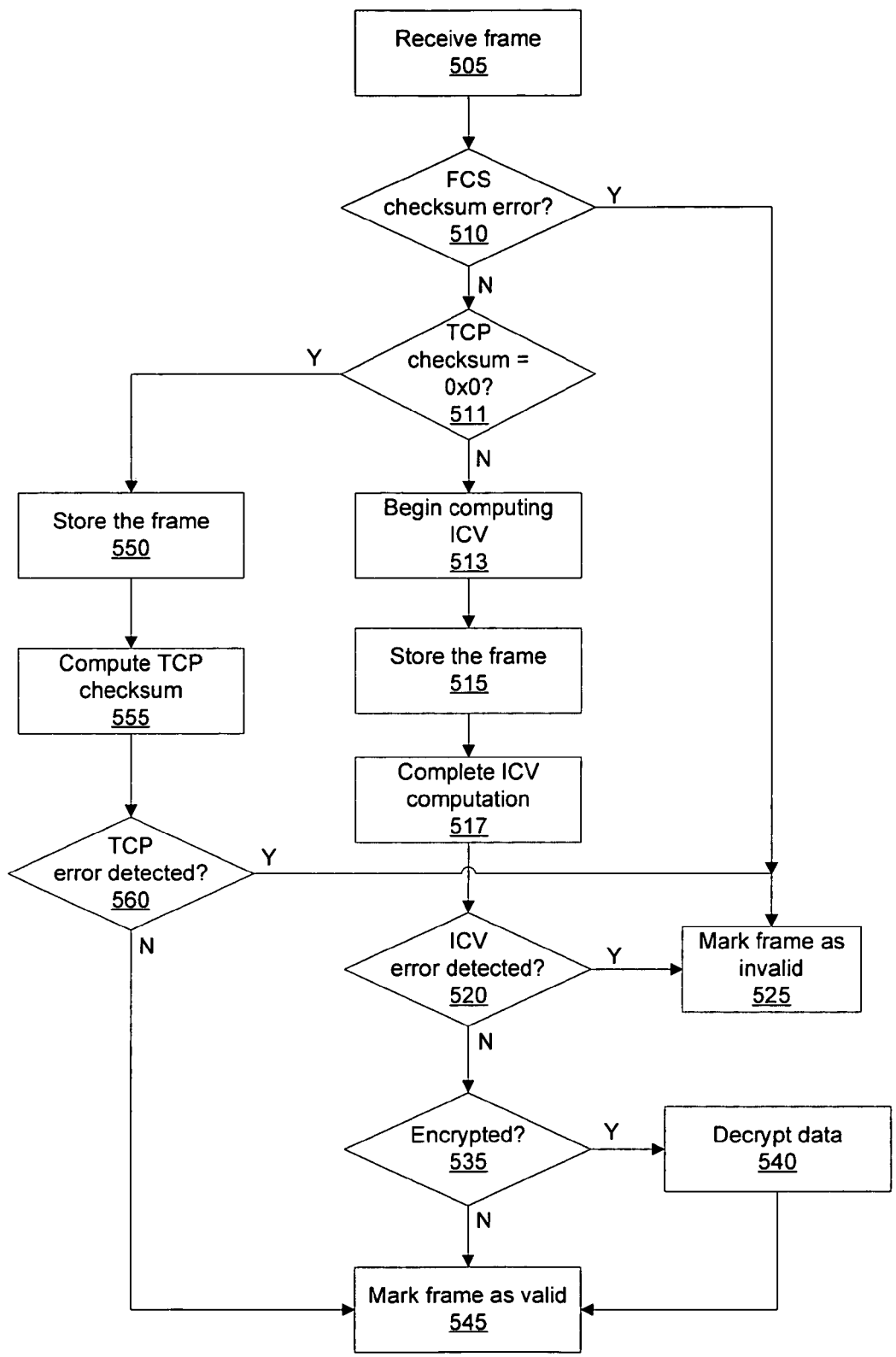
FIG. 5 illustrates an embodiment of a method of receiving a frame in accordance with one or more aspects of the present invention.

FIG. 5 illustrates an embodiment of a method of receiving a frame in accordance with one or more aspects of the present invention. In step 505 a frame is received by a receiver using the TCP alternate checksum option. Those skilled in the art will recognize that NIC 150 may perform the functions of the receiver. In step 510, the receiver determines if a FCS checksum error exists, and, if so proceeds to step 525. Otherwise, in step 511 the receiver determines if a predetermined value, such as 0x0, is present in the TCP checksum field within the frame. The predetermined value indicates that the connection between the receiver and a sender has been setup to use the TCP alternate checksum option. If, in step 511 the receiver determines the TCP alternate checksum option is used, the receiver proceeds to step 513. Otherwise, the receiver proceeds to step 550.

In step 550, the receiver stores the frame in a buffer. Alternatively, TCP payload data produced by parsing the frame is stored in the buffer. In some embodiments the receiver includes a dedicated storage resource, e.g., random access memory (RAM), FIFO memory, or the like, sized to buffer the largest frame size. In other embodiments the receiver, such as a NIC, uploads the frame to system memory. In step 555 the receiver computes a conventional TCP checksum and in step 560 the receiver determines if a TCP error is detected, i.e., the TCP checksum computed in step 560 does not equal a TCP checksum present in the TCP checksum field of the frame. If a TCP error is detected, then the receiver proceeds to step 525. If a TCP error is not detected, then the receiver proceeds to step 545. Alternatively, if a TCP error is not detected, then the receiver proceeds to step 535.

In step 513, the receiver begins computing an ICV using the shared key because the connection is setup for the TCP alternate checksum option. In step 515 the receiver stores the frame in a buffer. Alternatively, TCP payload data produced by parsing the frame is stored in the buffer. In step 517, the receiver completes computing of the ICV and produces a computed ICV. In step 520 the receiver determines if an ICV error is detected by comparing two ICVs, the computed ICV and an ICV extracted from the frame. An error is detected with the two ICVs are not equal, and in step 525 the receiver marks the frame is invalid. In an embodiment of the receiver including a dedicated storage resource, the dedicated storage resource is flushed.

If, in step 520 the receiver determines that an ICV error is not detected, then, in step 535 the receiver determines if payload data within the frame is encrypted. If the payload data is encrypted, then in step 540 the receiver decrypts the payload data. In some embodiments the receiver performs the decryption and in other embodiments a host CPU performs the decryption, reading the payload data from system memory. If, in step 535 the receiver determines that the payload data is not encrypted, then in step 545 the receiver marks the frame as valid.

According to the IPsec standard, ESP authentication only covers an ESP header and the corresponding encapsulated data, e.g., a TCP header and payload data. When the TCP alternate checksum option is used in accordance with the present invention, an ICV included in a frame is computed using additional fields within the frame, providing an enhanced form of ESP-based authentication. Specifically, immutable fields within the frame are input to an ESP authentication calculation used to compute the ICV, where the ESP authentication calculation is based on an ESP authentication transform and a shared key.

Figure 6:
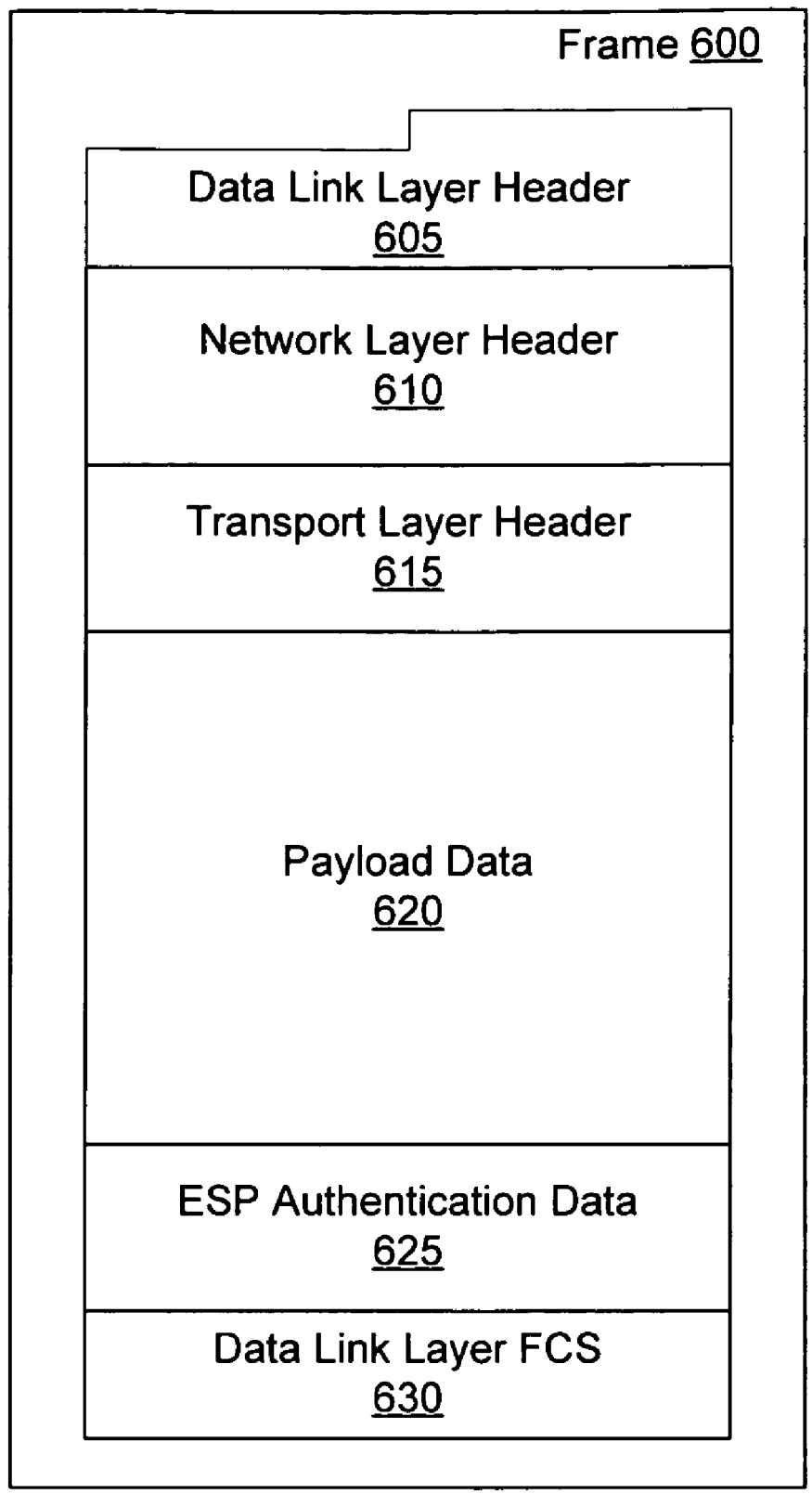
FIG. 6 illustrates a frame in accordance with one or more aspects of the present invention.

FIG. 6 illustrates a Frame 600 in accordance with one or more aspects of the present invention. A Data Link Layer Header 605 within Frame 600 may include immutable fields for an ETHERNET header, such as a MAC destination address, a MAC source address, and an EtherType. Each immutable field within Data Link Layer Header 605 may be included in the enhanced ICV computation.

A Network Layer Header 610 within Frame 600 may include immutable and mutable fields, i.e., fields whose contents may change as a frame is transmitted through a network, for an IPv4 or IPv6 header. For example, when Network Layer Header 610 is an IPv6 header it includes several immutable fields, such as fields including a version, a payload length, a next header, a source address, a payload length, and the like. Furthermore, when Network Layer Header 610 is an IPv4 header it includes several immutable fields, such as fields including a version, an IHL, a total length, an identification, a protocol, a source address, a destination address, and the like. Network Layer Header 610 may also include an ESP header which in turn includes immutable fields such as fields including a security parameters index (SPI) and a sequence number field. Each immutable field within Network Layer Header 610 may be included in the ICV computation.

Network Layer Header 610 may also include one or more mutable fields, for IPv6 such as a destination address field. Likewise, Network Layer Header 610 may also include one or more mutable fields for IPv6, such as a field including a type of service (TOS), flags, a fragment offset, a time to live, a header checksum, and the like. Mutable fields are not included in the ICV computation.

An ESP Authentication Data 625 within Frame 600 includes the ICV and therefore is not included in the ICV computation. A Data Link Layer FCS 630, such as an ETHERNET FCS or an FCS for other LAN and WAN protocols, is also not included in the ICV computation. An upper frame size limit exists beyond which the FCS for a frame, such as Frame 600, is not effect for detecting a bit error in the frame. For example, when a frame is larger than 16 Kbytes in size the ETHERNET FCS is no longer adequate to detect multi-bit errors in a transmitted frame. The ICV is more robust than the FCS and therefore, using the TCP alternate checksum option enables detection of multi-bit errors for transmitted frames larger than 16 Kbytes. For example, even a single bit error will change the computed ICV.

Consequently, using the TCP alternate checksum option enables accurate transmission of larger frames compared with frames transmitted using a conventional TCP checksum and LAN FCS. Transmitting larger frames may result in higher network performance with lower CPU utilization. Specifically, IPv4 packets with 65,535 bytes and IPv6 packets with a payload length of up to 4,294,967,295 bytes (a jumbo payload) may be accurately transmitted using the TCP alternate checksum option as described in conjunction with FIGS. 3A, 3B, 4A, 4B, and 5. Furthermore, the transmit latency for these larger frames remains a constant, independent of a particular frame size, when the TCP alternate checksum option is used.

Figure 7A:
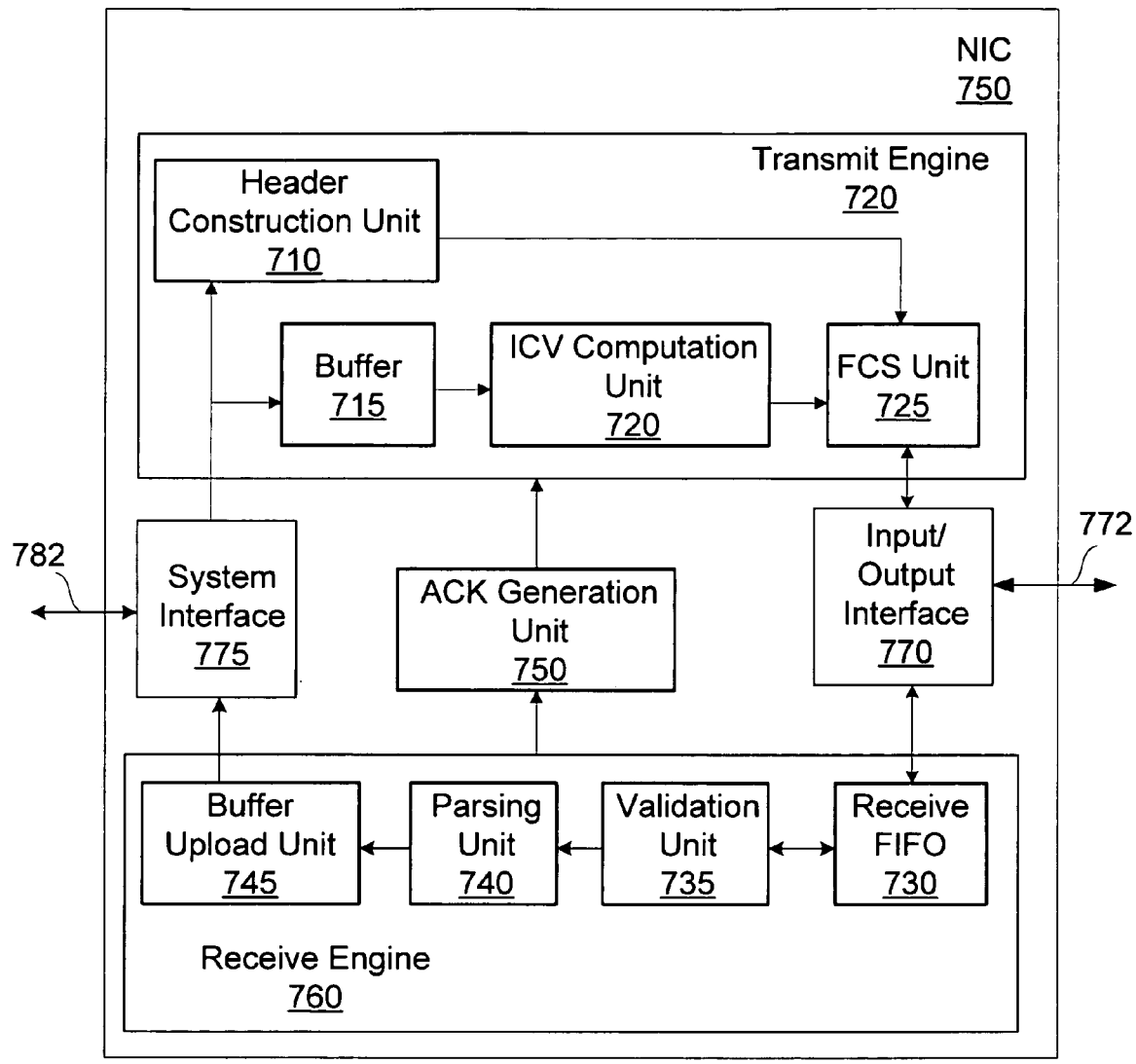
FIG. 7A illustrates a block diagram of a NIC in accordance with one or more aspects of the present invention.

FIG. 7A illustrates a block diagram of a NIC 750 in accordance with one or more aspects of the present invention. NIC 750 is an alternate embodiment of NIC 150 shown in FIGS. 1, 2A, 2B, and 2C in accordance with one or more aspects of the present invention. Those skilled in the art will recognize that the functions performed by subunits within NIC 750 may be performed by the subunits within NIC 150, e.g., System Interface 175, NIC Processor 155, NIC Memory 160, MAC 165, and Input/Output Interface 170.

A System Interface 775 interfaces via a Bus 782 one or more subunits within an I/O controller, an I/O bridge, an integrated controller, or the like. System Interface 775 is used to send and receive data between system memory, such as System Memory 230 shown in FIGS. 2A, 2B, and 2C, and subunits within NIC 750, and to send and receive commands between a CPU, such as CPU 210, and subunits within NIC 750. An Input/Output Interface 770 may include subunits configured to interface with a PHY coupled to NIC 750 via Connection 772. In an alternate embodiment of NIC 750, the PHY is integrated into NIC 750 and Connection 772 is a network.

A Transmit Engine 720 includes subunits configured to construct outbound frames, including header construction, acknowledgement insertion, ICV computation, and FCS computation. Transmit Engine 720 receives connection information for connections from a TCP Stack. Connection information may include an acknowledgement state, connection addresses, pointers to system memory buffers, MSS, transmit window size, receive window size, timestamp data, one or more shared keys, one or more private keys, and the like. Transmit Engine 720 may include a storage resource (not shown), to store at least a portion of the connection information. Connection information for a connection may be updated by the TCP Stack while a connection is active.

System Interface 775 receives data from transmission and outputs the data to a Buffer 715 and a Header Construction Unit 710. In an embodiment of NIC 750 supporting conventional TCP checksums, Buffer 715 is large enough to store the maximum frame size. In an embodiment of NIC 750 supporting the TCP alternate checksum option, Buffer 715 may be omitted. Header Construction Unit 710 receives the data and connection information and constructs one or more headers as needed. For example, Header Construction Unit 710 may construct multiple headers as needed during fragmentation. Each header is output to an FCS Unit 725 and output to Connection 772 via Input/Output Interface 770. Buffer 715 is a storage resource that outputs the payload portion of the data received via System Interface 775 to an ICV Computation Unit 720.

ICV Computation Unit 720 computes the ICV based on the payload data and a shared key. The ICV computation may be completed using an ESP authentication transform that is fixed or specified for each connection when the connection is setup. ICV Computation Unit 720 also performs ICV padding as needed prior to outputting the ICV to FCS Unit 725. FCS Unit 725 computes the FCS using techniques known to those skilled in the art. FCS outputs frames for transmission, including headers and payload data, to Input/Output Interface 770.

A Receive Engine 760 includes a Receive FIFO 730 for storing received frames input to NIC 750 via Input/Output interface 770. Receive Engine 760 includes subunits configured to parse the incoming frame and determine whether or not the frame is valid, i.e., computing checksums, verifying flags, and identifying the frame type, e.g., IP, UDP, TCP, and the like.

A Validation Unit 735 computes an FCS for the frame and determines if it matches the FCS included in the frame, and if not, receipt of the frame is not acknowledged, the frame is marked as invalid, and the frame buffered in Receive FIFO 730 is flushed. Otherwise, the frame is marked as valid and Validation Unit 735 outputs the partially parsed frame to Parsing Unit 740. Receive Engine 760 also outputs a signal to an ACK Generation Unit 750 instructing ACK Generation Unit 750 to generate an acknowledgement for the received frame.

Validation Unit 735 determines a protocol type for each partially parsed frame, e.g., TCP, UDP, IP, and the like, and determines if the TCP alternate checksum option is used. When the TCP alternate checksum is used, Validation Unit 735 computes the ICV and determines if it matches the ICV in the frame, and if not, receipt of the frame is not acknowledged, the frame is marked as invalid, and the frame buffered in Receive FIFO 730 is flushed. Otherwise, the frame is marked as valid and Validation Unit 735 outputs the partially parsed frame to Parsing Unit 740. Receive Engine 760 also outputs a signal to an ACK Generation Unit 750 instructing ACK Generation Unit 750 to generate an acknowledgement for the received frame.

Parsing Unit 740 receives the partially parsed frames and produces payload data that is output to a Buffer Upload Unit 745. For example, Parsing Unit 740 extracts the source IP address, TCP sequence number, TCP acknowledgement number, TCP source and destination port numbers, the TCP window size, the TCP header length, and the like. A portion of the extracted data may be output by Receive Engine 760 to Transmit Engine 720 via ACK Generation 750.

Buffer Upload Unit 745 uploads the parsed frames to system memory via System Interface 775. Buffer Upload Unit 745 specifies locations to write in system memory based on information received from the TCP Stack. In an alternate embodiment of NIC 750 Receive FIFO 730 is omitted and the payload data or frame is uploaded to system memory prior to determining whether or not any bit errors exist as indicated by the FCS or ICV.

Figure 7B:
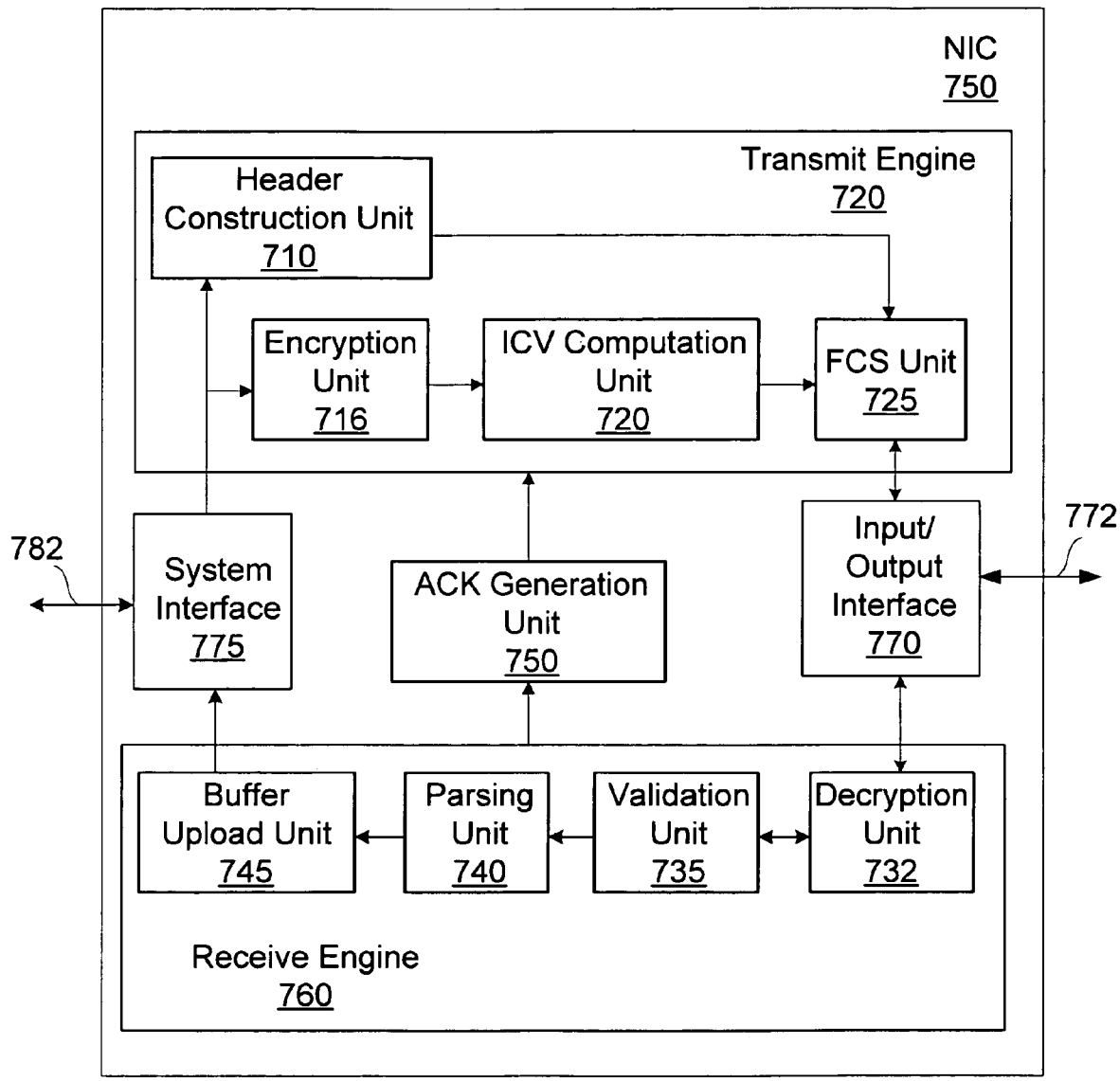
FIG. 7B illustrates a block diagram of a NIC including encryption and decryption in accordance with one or more aspects of the present invention.

FIG. 7B illustrates a block diagram of a NIC including an Encryption Unit 716 and a Decryption Unit 732 in accordance with one or more aspects of the present invention. Buffer 715 is replaced with Encryption Unit 716 that may include the functionality provided by Buffer 715. Encryption Unit 716 receives the payload data for transmission and produces encrypted payload data using a private key included in the connection information. The encrypted payload data is output to ICV Computation Unit 720 and the functions of ICV Computation Unit 720 and FCS Unit 725 are as previously described in conjunction with FIG. 7A.

The present invention defines a mechanism that enables use of a TCP alternate checksum option instead of a conventional TCP checksum. Specifically, an ICV is computed for a frame and used as the TCP alternate checksum and the ICV is located at the end of the frame. Furthermore, use of a static or dynamic key for computing the ICV may be specified using a code point. An advantage of using the TCP alternate checksum option is that transmit frame latency is significantly reduced compared with using the conventional TCP checksum. Furthermore, the ICV may be computed using a greater portion of the frame, providing the ability to detect bit errors introduced during the transmission of larger sized frames.

Receive FIFO 730 is replaced with Decryption Unit 732 that may include the functionality provided by Receive FIFO 730. Decryption Unit 732 which receives frames input to NIC 750 via Input/Output interface 770 and produces decrypted frame data using the private key included in the connection information. The decrypted payload data is output to Validation Unit 735 and the functions of Validation Unit 735, Parsing Unit 740, and Buffer Upload Unit 745 are as previously described in conjunction with FIG. 7B.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

What is claimed is:

1. A method of setting up a TCP connection with a peer to use a TCP alternate checksum option, comprising:
   determining whether the peer supports using a dynamic key code-point for the TCP alternate checksum option, wherein the dynamic key code-point specifies that an Internet Security (IPsec) Encapsulating Security Payload (ESP) authentication transform algorithm uses a dynamic key to compute an integrity check value for TCP payload data;
   negotiating a key exchange with the peer when the dynamic key code-point is supported; and
   using a static key code-point when the key exchange negotiation fails.

2. The method of claim 1, further comprising using a static key code-point when the peer does not support using the dynamic key code-point.

3. The method of claim 1, further comprising determining a maximum packet size.

4. The method of claim 1, further comprising negotiating a key exchange with the peer to obtain a private key for encrypting and decrypting payload data.

5. The method of claim 1, further comprising:
   receiving a portion of the TCP payload data for transmission;
   receiving all remaining portions of the TCP payload data for transmission;
   transmitting the portion of the TCP payload data and all of the remaining portions of the TCP payload data without computing a TCP checksum; and
   computing an integrity check value for the portion of the TCP payload data.

6. The method of claim 5, further comprising placing a predetermined value in a field designated for the TCP checksum.

7. The method of claim 5, further comprising transmitting the integrity check value.

8. The method of claim 5, wherein the integrity check value is computed using a static key.

9. The method of claim 5, wherein the integrity check value is computed using a dynamic key.

10. The method of claim 5, wherein the integrity check value is computed using an ESP authentication transform.

11. The method of claim 5, further comprising encrypting the portion of the TCP payload data using a private key.

12. The method of claim 5, wherein the integrity check value is computed using an ESP header and the portion of the TCP payload data.

13. The method of claim 5, wherein the integrity check value is computed using an ESP header, the portion of the TCP payload data, and immutable fields within a frame including the TCP payload data.

14. The method of claim 5, further comprising:
   determining that a frame is complete; and
   outputting the integrity check value in an Encapsulating Security Payload field of the frame that is positioned after the TCP payload data.

15. A method of receiving TCP payload data over a connection using a TCP alternate checksum option, comprising:
   receiving the TCP payload data within a frame;
   determining the TCP alternate checksum option is setup for the connection;
   determining whether a static key code point or a dynamic key code point is specified for the connection, wherein the dynamic key code-point specifies that an Internet Security (IPsec) Encapsulating Security Payload (ESP) authentication transform algorithm uses a dynamic key to compute an integrity check value for the TCP payload data and the static key code-point specifies that the IPsec ESP authentication transform algorithm will use a static key to compute the integrity check value for the TCP payload; and
   computing the integrity check value using the TCP payload data and a shared key.

16. The method of claim 15, wherein the shared key is a dynamic key and the dynamic key code point is specified for the connection.

17. The method of claim 15, wherein the shared key is a static key and the static key code point is specified for the connection.

18. The method of claim 15, wherein the integrity check value is computed using an ESP header and the TCP payload data.

19. The method of claim 15, wherein the integrity check value is computed using an ESP header, the TCP payload data, and immutable fields within a frame including a frame header and an IP header.

20. The method of claim 15, further comprising decrypting the TCP payload data using a private key.

21. The method of claim 15, wherein the step of determining the TCP alternate checksum option is used identifies when a predetermined value is present in a TCP checksum field within the frame.

* * * * *